United States Patent Office 3,158,493
Patented Nov. 24, 1964

3,158,493
ADHESIVE COMPOSITION AND METHOD
Louis Long, Jr., Concord, and Erik Vis, Cochituate, Mass., assignors to the United States of America as represented by the Secretary of the Army
No Drawing. Original application Nov. 21, 1960, Ser. No. 70,895, now Patent No. 3,127,361, dated Mar. 31, 1964. Divided and this application Oct. 9, 1961, Ser. No. 146,073
4 Claims. (Cl. 106—162)

This invention concerns tolylsulfonyl-sucrose containing compositions and processes for making them. These compositions are useful as adhesives, cellular plastics, and for other purposes hereafter stated.

This application is a division of our copending application Serial Number 70,895, filed November 21, 1960, now Patent No. 3,127,361, granted Mar. 31, 1964.

It has heretofore been proposed in Patent No. 2,365,776, Albert L. Raymond et al., dated December 26, 1944, to react sucrose and p-tolylsulfonyl chloride, whereby to substitute three of the eight hydroxyl groups of the sucrose molecule by p-tolylsulfonyl radicals. We have found by chromatographic analysis that compounds obtained in accordance with the teaching of this patent are not chemically pure but are a mixture principally consisting of tetra-O-p-tolylsulfonyl-sucrose and small amounts of sucrose with varying degrees of tolylsulfonylation.

In the course of our research we have succeeded in the production of chemically pure tri-O-p-tolylsulfonyl sucrose and tetra-O-p-tolylsulfonyl-sucrose, and have proved them to be such by chromatographic analysis. We have further made the unexpected discovery that tetra-O-p-tolylsulfonyl-sucrose is useful as a strong adhesive for glass and other difficult-to-laminate substances, if the tetra-O-p-tolysulfonyl-sucrose is plasticized with a commercially available plasticizer such as sucrose acetate isobutyrate.

In the following description of our invention we will first set forth syntheses of chemically pure tri-O-p-tolyl-sulfonyl sucrose and tetra-O-p-tolylsulfonyl-sucrose. It will be understood that the descriptive matter of the following examples is not intended to limit the scope of our invention to the specific data therein set forth.

EXAMPLE 1

*Synthesis of Tri-O-p-Tolylsulfonyl Sucrose*

A solution of 80 g. of sucrose (.23 mol) in 1250 ml. of pyridine obtained by boiling is cooled to −40°, whereupon 136 g. (.71 mol) of tolylsulfonyl chloride is added with vigorous stirring. Stirring is continued until all the tolylsulfonyl chloride is dissolved. After 3 hours at −40° and 17 hours at −17°, a crystalline precipitate appears (approximately 5–10 g.). Saturated aqueous sodium bicarbonate (30 ml.) is added and the mixture held at 25° for 30 minutes, after which it is poured into 8 l. of dilute aqueous sodium bicarbonate. The aqueous phase is decanted and the oily precipitate triturated with repeatedly renewed water. The residue is then dissolved in dichloromethane, shaken with 1 N-sulfuric acid, water, and aqueous sodium bicarbonate, dried with sodium sulfate, and evaporated in vacuum to give a brittle foam which is pulverized and further dried in a desiccator. Yield 118 g. (63%). *Analysis.*—Calculated for $C_{33}H_{40}O_{17}S_3$:S, 11.95. Found: S, 11.97 (average).

EXAMPLE 2

*Synthesis of Tetra-O-p-Tolylsulfonyl-Sucrose*

A solution of 500 g. of sucrose and 20 g. of disodium phosphate in 600 ml. of water is diluted with 300 ml. of 1,2-dimethoxyethane and stirred vigorously while 1 kg. of tolylsulfonyl chloride, technical grade (=4.48 moles per mole of sucrose) is added batchwise. Aqueous sodium hydroxide (50% w./v.) is admitted at a rate such as to keep the pH between 8 and 10. The temperature is held between 15 and 25° by keeping the reaction vessel in a cold water bath. The addition of sodium hydroxide is discontinued after 7½ hours, as the pH then remains constant. A total of 447 ml. of sodium hydroxide solution, containing 223.5 g. of anhydrous sodium hydroxide is added. Stirring is stopped after 9½ hours. Ten liters of water are added, the gum triturated with repeatedly renewed water (decantation), then dissolved in dichloromethane. The solution is dried with sodium sulfate, whereupon the solids are removed by centrifugation. The solution is evaporated in batches in such a manner that a foam is formed, which is pulverized and further dried in vacuum. Yield 878 g. (78%). *Analysis.*—Calculated for $C_{40}H_{46}O_{19}S_4$: C, 50.09; H, 4.83; S, 13.39. Found: C, 50.33; H, 4.79; S, 13.34.

Other solvents such as N,N-dimethylformamide or dimethylsulfoxide may be substituted for the 1,2-dimethoxyethane.

Tetra-O-p-tolylsulfonyl-sucrose is miscible with suitable plasticizers in desired proportions so as to obtain oil resistant coatings or laminated compositions and adhesives for metals, wood, plastics, and glass. The following example illustrates this aspect of the invention.

EXAMPLE 3

*Plasticization of Tetra-O-p-Tolylsulfonyl Sucrose With Sucrose Acetate Isobutyrate*

Tetra-O-p-tolylsulfonyl-sucrose and sucrose acetate isobutyrate (SAIB, Eastman Chemical Products, Inc., Kingsport, Tenn.) in a proportion of about 5:2, are dissolved in a small amount of dichloromethane (or other suitable solvent); the required consistency is then obtained by evaporating the appropriate amount of solvent. The ensuing mixture forms a clear colorless film upon casting on a glass plate and provides a strong, transparent and colorless bonding material for two glass plates.

Another plasticizer, such as tri-ethyl citrate, dioctyl phthalate, furfuryl alcohol, citral, or tricresyl phosphate, may be used to replace part or all of the sucrose acetate isobutyrate of the foregoing example.

Having thus described the principle of our invention and several illustrative examples of carrying the same into practice, we wish it understood that departures and variations will readily occur to the expert. These and similar variations are intended to be encompassed within the scope of our invention which we now proceed to define by the appended claims.

We claim:

1. A strong transparent adhesive composition essentially consisting of tetra-O-p-tolylsulfonyl-sucrose plasticized with at least one member selected from the group consisting of sucrose acetate isobutyrate, tri-ethyl citrate, dioctyl phthalate, furfuryl alcohol, citral, and tricresyl phosphate.

2. A strong transparent adhesive composition essentially consisting of tetra-O-p-tolylsulfonyl-sucrose plasticized with sucrose acetate isobutyrate.

3. Method of bonding two surfaces, comprising interposing therebetween a film of tetra-O-p-tolylsulfonyl sucrose plasticized with at least one member selected from the group consisting of sucrose acetate isobutyrate, tri-ethyl citrate, dioctyl phthalate, furfuryl alcohol, citral, and tricresyl phosphate.

4. Method of bonding two glass surfaces, comprising interposing therebetween a colorless film of tetra-O-p-tolylsulfonyl sucrose plasticized with sucrose acetate isobutyrate.

References Cited in the file of this patent
UNITED STATES PATENTS

| | | |
|---|---|---|
| 2,135,075 | Herrmann | Nov. 1, 1938 |
| 2,137,168 | Levey | Nov. 15, 1938 |
| 2,314,972 | Dreyfus | Mar. 30, 1943 |
| 2,365,776 | Raymond et al. | Dec. 26, 1944 |
| 2,931,802 | Tovey et al. | Apr. 5, 1960 |

OTHER REFERENCES

Markevich: Colloid J. (U.S.S.R.), vol. 4, pages 729–737, 1938 (C.A. vol. 33, page 6121, 1939).

SAIB, Eastman Chemical Products, Inc., Bulletin No. N–105, 15 pages (1959).